United States Patent [19]

Matsuura et al.

[11] 4,322,474

[45] Mar. 30, 1982

[54] MAGNETIC RECORDING MEDIUM

[75] Inventors: Takeshi Matsuura, Kyoto; Seiji Watatani, Takatsuki, both of Japan

[73] Assignee: Hitachi Maxell, Ltd., Osaka, Japan

[21] Appl. No.: 126,944

[22] Filed: Mar. 3, 1980

[30] Foreign Application Priority Data

Mar. 3, 1979 [JP] Japan ................................. 54-24965

[51] Int. Cl.$^3$ ............................................. G11B 5/70
[52] U.S. Cl. ................................ 428/411; 252/62.54; 427/128; 360/134; 428/694; 428/695; 428/900
[58] Field of Search ............. 428/900, 539, 694, 695, 428/411; 427/128; 252/62.54; 360/134, 135, 136

[56] References Cited

U.S. PATENT DOCUMENTS

| | | | |
|---|---|---|---|
| 3,634,253 | 1/1972 | Akashi et al. | 428/900 |
| 3,833,412 | 9/1974 | Akashi et al. | 428/900 |
| 4,018,968 | 4/1977 | Neumann et al. | 428/695 |
| 4,075,384 | 2/1978 | Suzuki et al. | 428/900 |
| 4,091,143 | 5/1978 | Hartmann et al. | 428/900 |
| 4,153,754 | 5/1979 | Huisman | 252/62.54 |
| 4,172,176 | 10/1979 | Tanuka et al. | 428/900 |
| 4,186,228 | 1/1980 | Ogawa et al. | 428/695 |
| 4,247,407 | 1/1981 | Naruse et al. | 428/695 |

FOREIGN PATENT DOCUMENTS 2506210  9/1975  Fed. Rep. of Germany ...... 427/128
2916146 10/1979  Fed. Rep. of Germany ...... 428/906

*Primary Examiner*—Stanley S. Silverman
*Attorney, Agent, or Firm*—Birch, Stewart, Kolasch and Birch

[57] ABSTRACT

A magnetic recording medium, prevented from blooming of the lubricants therein even after used at a high temperature under a high humidity for a long period of time and excellent in abrasion resistance and durability, comprising an elastic base sheet and a magnetic layer containing magnetic powders and a binder, characterized in that the magnetic layer further contains (A) at least one of esters of saturated aliphatic acids having 18 carbon atoms with aliphatic alcohols having 3 to 6 carbon atoms, (B) at least one of saturated aliphatic acids having 14 to 18 carbon atoms and (C) at least one of zinc salts of saturated aliphatic acids having 14 to 18 carbon atoms, the content of the component (A) being from 0.5 to 2.0% by weight based on the weight of the magnetic powders in the magnetic layer, the content of the component (B) being from $\frac{1}{4}$ to 1 part by weight to one part by weight of the component (A) and the content of the component (C) being from $\frac{1}{3}$ to 1 part by weight to one part by weight of the combined amount of the components (A) and (B).

3 Claims, No Drawings

MAGNETIC RECORDING MEDIUM

The present invention relates to a magnetic recording medium. More particularly, it relates to a magnetic recording medium, which eliminates the blooming of a lubricant even after being used at a high temperature under high humidity for a long period of time, having running stability and durability.

BACKGROUND OF THE INVENTION

A magnetic recording medium for video, audio, computer use or the like travels slidably on a magnetic recording head on the recording and reproducing and therefore its magnetic layer is apt to be abraded. Because of this reason, it is desirable for the magnetic layer of a magnetic recording medium to be excellent in abrasion resistance. In the case of a magnetic recording tape for video use which slides on a magnetic recording head at a high speed it is particularly desirable for, its magnetic layer is particularly desired to have a high abrasion resistance at a high temperature because of the heat of friction produced on the sliding. Further, the recent development of magnetic recording apparatuses have resulted in the use of magnetic recording medium under various conditions. Thus, the appearance of a magnetic recording medium which is resistant to abrasion and excellent in durability under the drastic conditions such as a high temperature and high humidity is highly demanded.

In order to satisfy such demand, it has been proposed to incorporate a lubricant such as a higher aliphatic acid, a higher aliphatic alcohol or an aliphatic acid ester or a lubricaing composition consisting of an aliphatic acid ester and zinc stearate into the magnetic layer of a magnetic recording medium. Said lubricant is effective in enhancing the abrasion resistance but bleeds out onto the surface of the magnetic layer with lapse of time, even when incorporated in a small amount, so as to stain a magnetic recording head, a guide part or the like. In extreme cases, the bled lubricant makes the surface of the magnetic layer sticky, whereby the running of the magnetic recording tape becomes unstable. Said lubricating composition consisting of an aliphatic acid ester and zinc stearate prevents the blooming of the aliphatic acid ester as a lubricant and the running stability of a magnetic recording tape is increased with enhancement of the abrasion resistance. Under the drastic conditions such as a high temperature and a high humidity, however, the blooming of a lubricant is not sufficiently prevented, and the running of a magnetic recording tape is sometimes unstabilized.

SUMMARY OF THE INVENTION

As the result of an extensive study, it has now been found that the incorporation of a certain aliphatic acid ester and a certain aliphatic acid as lubricants with the zinc salt of a certain aliphatic acid into a magnetic layer effectively prevents the blooming of the lubricants even after being used at a high temperature under a high humidity for a long period of time and enhances the running stability as well as the abrasion resistance. This invention is based on the above finding.

DESCRIPTION OF THE PREFERRED EMBODIMENTS

According to the present invention, there is provided a magnetic recording medium comprising an elastic base sheet and a magnetic layer containing magnetic powders and a binder, characterized in that the magnetic layer further contains (A) at least one of esters of saturated aliphatic acids having 18 carbon atoms with aliphatic alcohols having 3 to 6 carbon atoms, (B) at least one of saturated aliphatic acids having 14 to 18 carbon atoms and (C) at least one of zinc salts of saturated aliphatic acids having 14 to 18 carbon atoms.

In the magnetic layer, the weight proportion of the magnetic powders and the binder (e.g. vinyl chloride/vinyl acetate copolymer, nitrocellulose) is usually from 60:40 to 85:15.

The aliphatic acid ester (A), which is one of the essential components to be incorporated into the magnetic layer according to this invention, is the ester of a saturated aliphatic acid having 18 carbon atoms with an aliphatic alcohol having 3 to 6 carbon atoms. Specific examples of the aliphatic acid ester are n-propyl stearate, n-butyl stearate, n-amyl stearate, n-hexyl stearate, etc. These have a good lubricity and are effective in improvement of abrasion resistance. They may be used alone or in combination. When the amount of the aliphatic acid ester to be incorporated together with the other two essential components is too small, a sufficient lubricating effect is not produced. When the amount is too large, it may bleed out onto the surface of the magnetic layer. Usually, its use in an amount of from 0.5 to 2.0% by weight on the basis of the weight of the magnetic powders in the magnetic layer is favorable.

The aliphatic acid (B), which is another essential component, is a saturated aliphatic acid having 14 to 18 carbon atoms. Specific examples are myristic acid, palmitic acid, stearic acid, etc. These are excellent in lubricity and can prevent an abnormal creaking phenomenon. They may be used alone or in combination. Usually, the aliphatic acid is incorporated into the magnetic layer in an amount of $\frac{1}{4}$ to 1 part by weight to one part by weight of the aliphatic acid ester. When the amount is too small, the friction coefficient of the magnetic layer can not be sufficiently decreased. When the amount is too large, the blooming onto the surface of the magnetic layer can not be prevented.

The zinc salt of an aliphatic acid (C), which is a further essential component, may be the zinc salt of a saturated aliphatic acid having 14 to 18 carbon atoms such as zinc stearate, zinc palmitate or zinc myristate. These salts are effective in preventing the blooming of the lubricants. They are preferably employed in an amount of $\frac{1}{3}$ to 1 part by weight to one part by weight of the combined amount of the aliphatic ester and the aliphatic acid for expecting the exertion of a sufficient preventive effect on the blooming even under the drastic conditions such as high temperature and high humidity, although its use in a smaller amount is still effective when the environmental conditions are not so drastic.

In order to make a magnetic layer comprising the said essential components, they may be blended with magnetic powders and a binder, followed by application of the resulting mixture onto the surface of an elastic base sheet (e.g. polyester film) to form a magnetic layer. Alternatively, the said essential components may be mixed together in an appropriate solvent, followed by coating, spraying or dipping of the resulting mixture onto the surface of a magnetic layer previously formed on an elastic base sheet. The thickness of the magnetic layer thus formed may be usually from 2 to 15 microns (after drying) depending upon the thickness of the elastic base sheet, which is ordinarily from 5 to 70 microns.

The present invention will be illustrated more in detail by the following Examples which are intended to demonstrate but not limit the subject matter of the present invention. Parts and percentages are by weight.

EXAMPLE 1

| Materials | Part(s) |
| --- | --- |
| Co-containing magnetic iron oxide | 100 |
| Carbon black | 6 |
| α-$Fe_2O_3$ particles (average size, 0.5 μ) | 6 |
| Zinc stearate | 0.5 |
| Vinyl chloride/vinyl acetate copolymer | 20 |
| Polyurethane prepolymer | 5 |
| Polyisocyanate | 2 |
| n-Butyl stearate | 0.8 |
| Myristic acid | 0.5 |
| Methylisobutylketone | 200 |

The above materials were mixed together in a ball mill to make a magnetic coating composition. The composition was applied onto a polyester film of 15μ in thickness, followed by drying to make a coating film of 5μ in thickness. The resulting film was calendered at the surface and slitted in a width of ½ inch to obtain a magnetic recording tape (Specimen No. 1).

EXAMPLE 2

In the same manner as in Example 1 but varying the amount of n-butyl stearate in the magnetic coating composition as shown in Table 1, a magnetic recording tape was prepared (Specimen Nos. 2 to 6).

TABLE 1

| Specimen No. | 2 | 3 | 4 | 5 | 6 |
| --- | --- | --- | --- | --- | --- |
| Amount of n-butyl stearate (parts(s)) | 0 | 0.3 | 0.5 | 2.0 | 2.5 |

EXAMPLE 3

In the same manner as in Example 1 but varying the amount of myristic acid in the magnetic coating composition as shown in Table 2, a magnetic recording tape was prepared (Specimen Nos. 7 to 11).

TABLE 2

| Specimen No. | 7 | 8 | 9 | 10 | 11 |
| --- | --- | --- | --- | --- | --- |
| Amount of myristic acid (part(s)) | 0 | 0.1 | 0.2 | 0.8 | 1.0 |

EXAMPLE 4

In the same manner as in Example 1 but varying the amount of zinc stearate in the magnetic coating composition as shown in Table 3, a magnetic recording tape was prepared (Specimen Nos. 12 to 16).

TABLE 3

| Specimen No. | 12 | 13 | 14 | 15 | 16 |
| --- | --- | --- | --- | --- | --- |
| Amount of zinc stearate (part(s)) | 0 | 0.2 | 0.4 | 1.2 | 1.4 |

EXAMPLE 5

In the same manner as in Example 1 but varying the kinds of the aliphatic acid ester, the aliphatic acid and the zinc salt of the aliphatic acid as shown in Table 4, a magnetic recording tape was prepared (Specimen Nos. 17 and 24).

TABLE 4

| Specimen No. | Aliphatic acid ester (A) | Aliphatic acid (B) | Zinc salt of aliphatic acid (C) |
| --- | --- | --- | --- |
| 17 | n-Butyl stearate | Lauric acid | Zinc laurate |
| 18 | n-Butyl stearate | Myristic acid | Zinc myristate |
| 19 | n-Butyl stearate | Stearic acid | Zinc stearate |
| 20 | n-Butyl palmitate | Myristic acid | Zinc laurate |
| 21 | n-Hexyl stearate | Myristic acid | Zinc myristate |
| 22 | n-Amyl stearate | Myristic acid | Zinc stearate |
| 23 | n-Hexyl stearate | Stearic acid | Zinc stearate |
| 24 | n-Butyl palmitate | Arachic acid | Zinc stearate |

Each of the above obtained specimens was assembled into a video cassette (VHS mode, T-120) and run with a video tape recorder (VT-5300), manufactured by Hitachi, Ltd.) at 40° C. under a relative humidity of 80%. The time of running (taking one going and returning as one time) until the clogging of the magnetic according head occurred was counted. Also, the staining at the guide part in the video tape recorder after 100 runnings and the abnormal creaking phenomenon of the magnetic recording tape during the running were observed. The results are shown in Table 5 wherein the marks have the following significances:

◎—no staining or abnormal creaking;
○—staining or abnormal creaking slightly observed;
△—staining or abnormal creaking frequently observed;
X—staining or abnormal creaking very frequently observed.

TABLE 5

| Specimen No. | Durability (time) | Staining | Abnormal creaking |
| --- | --- | --- | --- |
| 1 | >100 | ◎ | ◎ |
| 2 | 5 | ◎ | ○ |
| 3 | 83 | ◎ | ◎ |
| 4 | >100 | ◎ | ◎ |
| 5 | >100 | ○ | ◎ |
| 6 | >100 | △ | ○ |
| 7 | >100 | ◎ | X |
| 8 | >100 | ◎ | △ |
| 9 | >100 | ◎ | ◎ |
| 10 | >100 | ◎ | ◎ |
| 11 | >100 | ○ | ◎ |
| 12 | >100 | X | ◎ |
| 13 | >100 | △ | ◎ |
| 14 | >100 | △ | ◎ |
| 15 | >100 | ◎ | ◎ |
| 16 | 67 | ◎ | △ |
| 17 | >100 | X | △ |
| 18 | >100 | ○ | ◎ |
| 19 | >100 | ◎ | ○ |
| 20 | 78 | △ | ◎ |
| 21 | 98 | ○ | ◎ |
| 22 | >100 | ◎ | ◎ |
| 23 | 95 | ◎ | ○ |
| 24 | 67 | ◎ | X |

From the above results, it may be understood that the specimens having a magnetic layer comprising the ester of a saturated aliphatic acid having 18 carbon atoms with an aliphatic alcohol having 3 to 6 carbon atoms, a saturated aliphatic acid having 14 to 18 carbon atoms and the zinc salt of a saturated aliphatic acid having 14 to 18 carbon atoms respectively in amounts of 0.5 to 2.0% by weight based on the weight of the magnetic powders in the magnetic layer, of ¼ to 1 part by weight to one part by weight of the said ester and of ⅓ to 1 part by weight to one part by weight of the combined amount of the said ester and the said saturated aliphatic acid are particularly excellent in durability at a high temperature under a high humidity and produce neither staining nor abnormal creaking phenomenon (Specimen Nos. 1, 4, 9, 15, 18, 19, 21, 22 and 23).

The specimens having a magnetic layer containing none or a too small amount of the said ester are poor in durability (Specimen Nos. 2 and 3), while those having a magnetic layer containing a too large amount of the ester results in blooming onto the surface of the magnetic layer and the staining of the guide part (Specimen Nos. 5 and 6). The specimens having a magnetic layer containing none or a too small amount of the said aliphatic acid produce an abnormal creaking phenomenon (Specimen Nos. 7 and 8), while those having a magnetic layer containing a too large amount of the aliphatic acid results in staining (Specimen No. 11). The specimens having a magnetic layer containing none or a too small amount of the said zinc salt can not prevent the blooming of the lubricant onto the surface of the magnetic layer so that the guide part is stained (Specimen Nos. 12 and 13). When the magnetic layer contains a too large amount of the zinc salt, durability and abnormal creaking phenomenon are produced.

The specimens given the most excellent results in durability, staining prevention and abnormal creaking prevention (Specimen Nos. 1, 4, 15 and 22) were subjected to the same test as above with the exception of replacing the conditions (40° C., 80%RH) by the ones (5° C., 60%RH). Onto the magnetic recording tape in a stationary state, the magnetic recording head was contacted under driving so as to reproduce a still frame. The time until an abnormality was produced in the still frame due to the abrasion of the magnetic recording tape and/or the clogging of the magnetic according head (hereinafter referred to as "still frame reproducing time") was measured. The results are shown in Table 6.

TABLE 6

| Specimen No. | Still frame reproducing time (hr) |
|---|---|
| 1 | 5< |
| 4 | 5< |
| 15 | 5< |
| 22 | 3.5 |

In general, the still frame reproducing time of more than about 30 minutes does not present any obstacle to the practical use. As understood from the above results, the specimens comprising n-butyl stearate as the aliphatic acid ester (Specimen Nos. 1, 4 and 15) afford a particularly favorable result.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium comprising an elastic base sheet and a magnetic layer containing magnetic powders and a synthetic resin binder provided on said base sheet, characterized in that the magnetic layer further contains (A) at least one ester of stearic acid and an aliphatic alcohol having 3 to 6 carbon atoms, (B) at least one saturated aliphatic acid having 14 to 18 carbon atoms and (C) at least one zinc salt of a saturated aliphatic acid having 14 to 18 carbon atoms, wherein the content of the component (A) is from 0.5 to 2.0% by weight based on the weight of the magnetic powders in the magnetic layer, the content of the component (B) is from ¼ to 1 part by weight to 1 part of the component (A) and the content of the component (C) is from ⅓ to 1 part by weight to 1 part by weight of the combined amount of the components (A) and (B).

2. The magnetic recording medium according to claim 1, wherein the component (A) is $C_3$–$C_6$ alkyl stearate, the component (B) is myristic acid and the component (C) is zinc stearate.

3. The magnetic recording medium according to claim 2, wherein the component (A) is butyl stearate.

* * * * *